US005725195A

United States Patent [19]

Cotter

[11] Patent Number: 5,725,195

[45] Date of Patent: Mar. 10, 1998

[54] CYLINDER TRUNNION MOUNT

[76] Inventor: Jonathan P. Cotter, 7642 Bingham, Dearborn, Mich. 48126

[21] Appl. No.: 779,062

[22] Filed: Jan. 7, 1997

Related U.S. Application Data

[63] Continuation of Ser. No. 373,382, Jan. 17, 1995, abandoned.

[51] Int. Cl.$^6$ .................... F16M 1/00

[52] U.S. Cl. .................... 248/659; 248/674

[58] Field of Search .................... 248/659, 674, 248/49, 74.1, 74.4, 231.61, 68.1, 61, 316.6; 92/161, 128, 146, 147, 88

[56] References Cited

U.S. PATENT DOCUMENTS

| | | | |
|---|---|---|---|
| 1,191,531 | 7/1916 | Nilson | 92/118 |
| 3,464,661 | 9/1969 | Alesi, Jr. | 248/68.1 |
| 3,688,646 | 9/1972 | Flick et al. | 92/146 X |
| 3,738,232 | 6/1973 | Kado | 92/161 |
| 4,700,616 | 10/1987 | Stoll et al. | 92/161 X |
| 4,827,835 | 5/1989 | LaBair | 92/161 X |
| 5,237,909 | 8/1993 | Pirhadi | 248/74.4 X |

FOREIGN PATENT DOCUMENTS

| | | | |
|---|---|---|---|
| 8700256 | 1/1987 | WIPO | 248/74.3 |

*Primary Examiner*—Ramon O. Ramirez
*Attorney, Agent, or Firm*—Barnes, Kisselle, Raisch, Choate, Whittemore & Hulbert

[57] ABSTRACT

A trunnion mount for a fluid-actuated cylinder assembly which has a pair of opposed trunnion pins carried by a framework with a plurality of separate pieces that can be easily assembled onto the cylinder tie rods without having to disassemble the cylinder assembly. The frame pieces have a tongue at one end and a complementary groove at the opposite end and are assembled end-to-end to form the framework with an open center to accommodate the casing tube of the cylinder. The pieces have complementary gripping portions adjacent each end that releasably clamp the framework to the tie rods. Thus, the framework can be attached to the cylinder without disassembling it.

16 Claims, 1 Drawing Sheet

CYLINDER TRUNNION MOUNT

This application is a continuation of application Ser. No. 08/373,382, filed Jan. 17, 1995, now abandoned.

FIELD OF THE INVENTION

This invention relates to fluid-actuated cylinders and more specifically to a trunnion mount for a cylinder.

BACKGROUND OF THE INVENTION

In some applications of fluid-actuated devices, such as air and hydraulic cylinders, it is necessary to support the cylinder by a trunnion mount to allow pivoting or swiveling of the cylinder about an axis transverse thereto. A typical trunnion mount comprises a single body having an open center through which the cylinder freely extends. The trunnion mount supports the cylinder by a plurality of parallel tie rods extending through holes in the trunnion mount. The tie rods are symmetrically located about the cylinder and are connected at one end to the cylinder head. The trunnion mount is selectively located and secured at a desired position on the tie rods. Trunnions on opposite sides of the mount are journalled to a support for pivoting the cylinder.

These trunnion mounts are typically a one-piece design and can only be attached to the cylinder by disconnecting the tie rods and removing the cylinder head. Only by removing the cylinder head is it possible to insert the tie rods through the corresponding holes in the trunnion mount and position the tubular body of the cylinder within the open center of the mount.

Installation of some of these trunnion mounts is further complicated by requiring that the tie rods be threaded through their corresponding holes in the trunnion mount. Still other trunnion mounts have split corners with a slit opening into a smooth through hole. The tie rods are inserted through the holes and are clamped therein by tightening transverse cap screws extending across the slits.

Attaching a trunnion mount to a cylinder in this manner is difficult, cumbersome and very time consuming.

SUMMARY OF THE INVENTION

A cylinder trunnion mount with a plurality of separate pieces each having a tongue at one end and a groove in the opposite end. The pieces are assembled end-to-end so that the tongue of one piece is received in the groove of an adjacent piece and releasably secured together to form a trunnion mount with an open center that accommodates the tubular casing of the cylinder. Each piece also has a gripping portion that cooperates with a gripping portion on the adjacent piece to clamp to the cylinder tie rods. Two opposed pieces each have a trunnion attached thereto for being journalled in a support to allow pivoting of the cylinder about the trunnions. Thus, a trunnion mount is provided that can be attached to a cylinder without having to disassemble the cylinder itself. This saves a considerable amount of time and effort in the assembly process and in mass production decreases the needed inventory of cylinders with trunnion mounts assembled thereto.

Objects, features and advantages of this invention are to provide a trunnion mount for a cylinder that is capable of being attached to and removed from the cylinder without any disassembly of the cylinder, is adapted to fit various cylinder assemblies, is easily movable longitudinally along the cylinder, is simple, stable, rugged, durable, reliable, quick and easy to use, and of relatively simple design and economical manufacture.

BRIEF DESCRIPTION OF THE DRAWINGS

These and other objects, features and advantages of this invention will be apparent from the following detailed description, appended claims and accompanying drawings in which:

DETAILED DESCRIPTION

Figure 1:
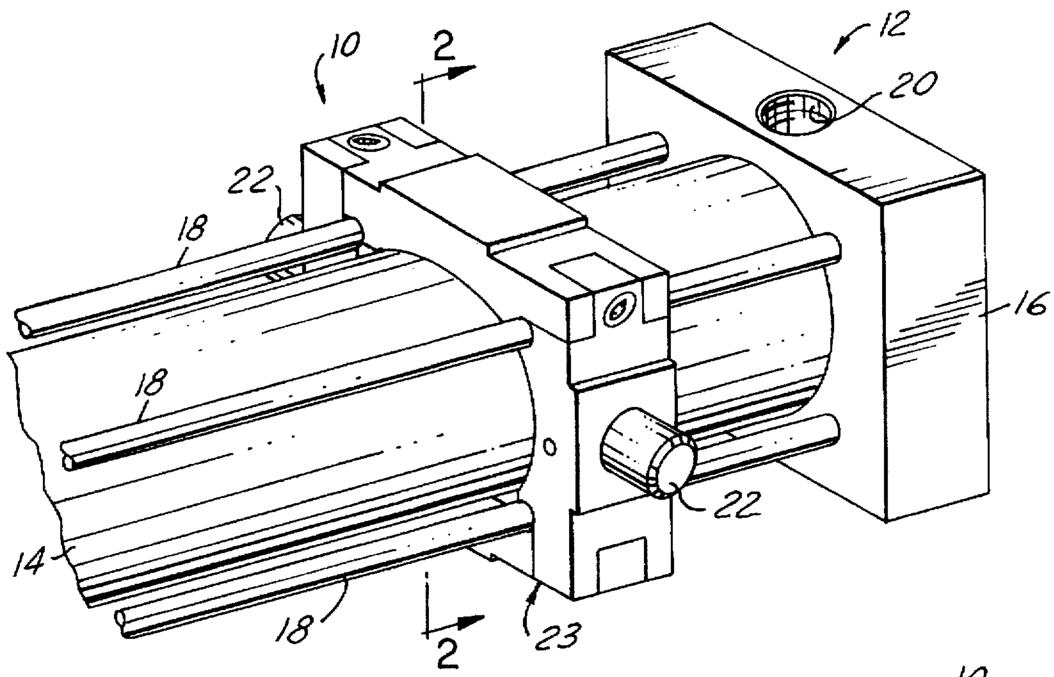
FIG. 1 is a perspective view of a fluid-actuated cylinder with a trunnion mount embodying this invention.

Referring in more detail to the drawings, FIG. 1 illustrates a trunnion mount 10 on a cylinder assembly 12. The assembly 12 has a tubular casing 14 with end caps 16 releasably secured on its opposed ends by tie rods 18. A piston (not shown) is slidably received in the casing 14 and attached to a rod which extends through one or both end caps. The piston is actuated by a pressurized fluid such as hydraulic oil or air which is admitted through port 20 in one or both end caps. Tie rods 18 are each connected at their ends to the caps 16 and are symmetrically spaced about the casing 14 in close proximity thereto and extend parallel to each other and the axis of the casing 14.

The trunnion mount 10 is assembled about the casing 14 and securely clamped to each tie rod 18. A pair of trunnion pins 22 are connected and secured to opposed sides of the trunnion mount 10. In use, each trunnion pin 22 is rotatably journalled in a support or base (not shown) to allow pivoting of the cylinder assembly 12 about the trunnions 22.

Figure 2:
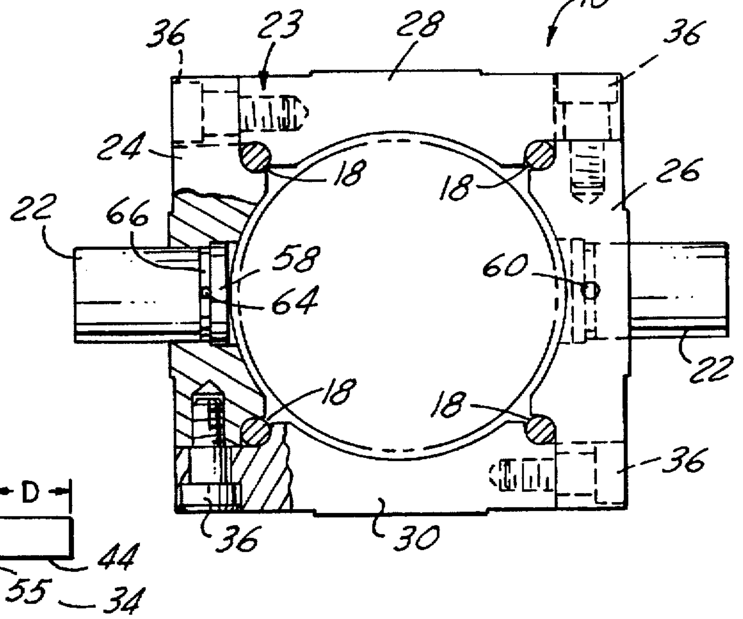
FIG. 2 is a partial cross-sectional view along line 2—2 in FIG. 1.
Figure 3:
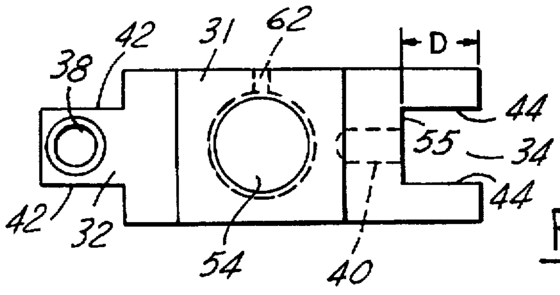
FIG. 3 is a top view of one of the trunnion receiving mounting pieces.
Figure 4:
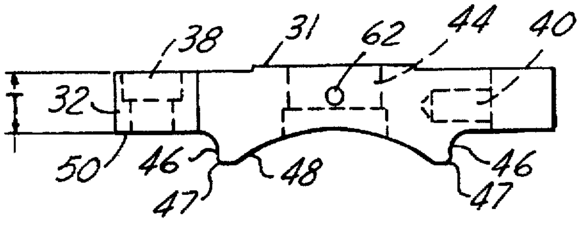
FIG. 4 is a front view of the mounting piece of FIG. 3.

As shown in FIGS. 1 and 2, the trunnion mount 10 has a framework or mounting block 23 which, in assembly, encircles the casing 14. The block 23 has four separate pieces or bars 24,26,28,30 which are assembled in end-to-end relationship. Each piece has an elongate body 31 with a tongue 32 at one end and a complementary groove 34 at the other end which slidably receives the tongue of an adjacent piece. In assembly, adjacent pieces are secured together by a cap screw 36 disposed in a counterbored hole 38 through each tongue 32 and received in a threaded blind hole 40 in each piece. To facilitate alignment and loose assembly, preferably the tongue 32 has parallel side faces 42 which are slidably received between complementary side faces 44 of the groove 34 of the adjacent piece.

When secured together in assembly, the mounting block 23 is rigidly clamped to the tie rods 18 by complementary semi-cylindrical gripping surfaces 46 adjacent each end of each piece. Preferably, the semi-cylindrical gripping surfaces 46 have a radius which is substantially the same as the radius of the tie rods 18. To facilitate assembly, preferably the arcuate extent of each gripping surface 46 is about ¼ of a quadrant or 90°. If desired, to facilitate insertion between adjacent tie rods, an inclined or tapered face 47 may be provided leading into the gripping surface 46. To provide clearance in assembly, each piece has a preferably semi-cylindrical surface 48 with a radius somewhat larger than the radius of the casing 14 of the cylinder. Thus, to prevent distortion of the cylinder 14, the assembled mounting block 23 does not engage it.

In the assembled block 23, adjacent gripping surfaces 46 firmly bear on the tie rod 18 disposed between them. To ensure this, the back face 50 of each tongue 32 and the bottom face 52 of each groove 34 are disposed and dimensioned relative to their immediately adjacent gripping surface 46 so that when they bear on each other, the radial or diametrical distance between the complementary gripping surfaces 52 is less than the diameter of the tie rod 18 received between them. Preferably, this diametrical distance is about 4 to 10 thousandths of an inch less than the diameter of the tie rods 18. The back face 50 and bottom face 52 are preferably flat or planar and are also located so that in assembly they abut one another to provide a positive stop limiting the extent to which the complementary gripping surfaces 52 can be forced into engagement with the tie rods 18. This prevents gouging and scarring of the tie rods 18. To provide flush outer surfaces of the engaged tongues and grooves, the thickness T of each tongue 32 is preferably substantially equal to the depth D of each groove 34.

As thus far described, each of the pieces 24,26,28 and 30 of the mounting block is substantially identical. Preferably, only two of the opposed pieces, for example, 24 & 26, have opposed central counterbored through holes 54 carrying trunnion pins 22. In the assembled block 23, the holes 54 are preferably coaxial or have preferably substantially the same longitudinal axis which preferably substantially intersects the longitudinal axis of the casing 14 and hence the longitudinal axis of the piston and rod of the casing 14. Preferably, each trunnion pin 22 has a head 58 which, in assembly, is received in the counterbore of the hole 54, and is releasably secured therein by a roll pin 60. The pin 60 is pressed into both a transverse hole 62 through the piece 24 or 26 and a coaxial blind hole 64 in the trunnion pin 22. Preferably, to facilitate making the trunnion pin 22, it has a relief groove 66 therein adjacent its head 58.

In use of the trunnion mount 10, the block pieces 24,26,28 & 30 are loosely assembled together in end-to-end relationship so that collectively they encircle the casing 14 of the cylinder and each adjacent pair of gripping surfaces 52 has a tie rod 18 slidably received between them. This loose assembly may be moved linearly along the tie rods 18 to provide the desired position of the pivot axis of the trunnion pins 22 and then releasably clamped or secured in this position by tightening the cap screws 36. Tightening the cap screws 36 forces adjacent pairs of the gripping surfaces 52 into firm frictional engagement with a tie rod 18 to thereby clamp the mounting block 23 to the tie rods 18 so that it will not move relative to the tie rods 18. In use, the trunnion pins 22 are journalled for rotation in a supporting structure (not shown). If desired, the location of the trunnion pin pivot axis relative to the casing 14 can be adjusted longitudinally without removing it from the support structure by loosening the cap screws 36, moving the cylinder 14 and hence the tie rods 18 to the desired position, and then retightening the cap screws 36, provided that the support structure provides adequate clearance for and access to the cap screws 36.

I claim:

1. A trunnion mount for a fluid-actuated cylinder assembly having a casing tube and a plurality of tie rods, said trunnion mount comprising:

at least three members, each member having a body with opposed ends and a gripper adjacent each end, a first connector portion at one end of each body, all of said first connector portions being substantially identical, a second connector portion at the other end of each body, all of said second connector portions being substantially identical, each said first connector portions being constructed to inter-engage with an adjacent second connector portion of an adjacent member, said members being constructed and arranged so that in an end-to-end assembly said first connector portion at one end of each and every of said members is removably connected to and inter-engaged with said second connector portion at the other end of an adjacent member to form a framework with an open center encircling the casing tube of the cylinder, and so that adjacent grippers of adjacent members releasably engage and grip an associated tie rod disposed between them for releasably clamping the framework to the tie rods of the cylinder assembly.

2. The trunnion mount of claim 1 wherein each gripper has a semi-cylindrical outer surface with a radius substantially equal to a radius of its associated tie rod.

3. A trunnion mount for a fluid actuated cylinder assembly having a casing tube and a plurality of tie rods, said trunnion mount comprising:

at least four bodies each having generally opposed ends and a gripper adjacent each end, a first connector portion immediately adjacent one end of each body, all of said first connector portions being substantially identical, a second connector portion mmeidately adjacent the other end of each body, all of said second connector portions being substantially identical, all of said bodies being constructed and arranged so that in end-to-end assembly said first connector portion of each and every said body is removably connected to said second connector portion of an adjacent body to form a framework with an open center encircling the casing tube of the cylinder, in assembly each of said bodies extending substantially the same arcuate extent around the casing tube and a fastener releasably securing the first connector portion of each body to the second connector portion of an immediately adjacent body so that adjacent grippers of adjacent members releasably engage and grip an associated tie rod disposed between them for releasably clamping the framework to the tie rods of the cylinder assembly.

4. The trunnion mount of claim 3 wherein each said gripper comprises a projection extending from the bottom surface of said body.

5. The trunnion mount of claim 4 wherein each member has at least two projections each located adjacent one end of said body.

6. The trunnion mount of claim 5 wherein each projection has a semi-cylindrical outer surface for engaging an associated tie rod.

7. The trunnion mount of claim 3 wherein at least two opposed bodies each have a trunnion pin centrally mounted thereto to extend laterally therefrom.

8. The trunnion mount of claim 7 wherein said trunnion pin comprises a body having a head portion at one end and a hole in said body adjacent said head.

9. The trunnion mount of claim 8 wherein said opposed bodies each have a through opening and a counterbore to receive said trunnion pin, a transverse hole communicating with said through opening, and a retainer pin located in said transverse hole to extend therethrough so that one end of said retainer pin is received in said hole in said trunnion pin to secure said trunnion pin to its associated body.

10. A trunnion for a fluid-actuated cylinder assembly having a casing tube and a plurality of tie rods, said trunnion mount comprising:

at least three members, each member having a body with opposed ends and a gripper adjacent each end, a tongue extending from one end of each said body, a groove in the other end of each said body, said members being constructed and arranged so that in an end-to-end assembly said tongue of each and every of said members is received within said groove of an adjacent member and removably secured thereto to form a framework with an open center encircling the casing tube of the cylinder, and so that adjacent grippers of adjacent members releasably engage and grip an associated tie rod disposed between them for releasably clamping the framework to the tie rods of the cylinder assembly.

11. The trunnion mount of claim 2 wherein said tongue has a back face and said groove has a bottom face, so that, in assembly, the back face of said tongue of one of said members abuts the bottom face of said groove of an adjacent member to limit the gripping force of said grippers on their associated tie rods.

12. The trunnion mount of claim 10 wherein each said tongue has a thickness and each said groove has a depth, and the tongue thickness is substantially equal to the groove depth.

13. A trunnion mount for a fluid-actuated cylinder assembly having a casing tube and a plurality of tie rods, said trunnion mount comprising:

at least three members, each member having a body with opposed ends and a gripper adjacent each end, a first connector portion at one end of each body, all of said first connector portions being substantially identical, a second first connector portion at the other end of each body, all of said second connector portions being substantially identical, each of said members is substantially identical in size and outer configuration, said members being constructed and arranged so that in an end-to-end assembly said first connector portion at one end of each and every of said members is removably connected to said second connector portion at the other end of an adjacent member to form a framework with an open center encircling the casing tube of the cylinder, and so that adjacent grippers of adjacent members releasably engage and grip an associated tie rod disposed between them for releasably clamping the framework to the rod of the cylinder assembly.

14. The trunnion mount of claim 13 wherein each said gripper has an arcuate surface spanning an angle of about 90°.

15. The trunnion mount for a fluid-actuated cylinder assembly having a casing tube and a plurality of tie rods, said trunnion mount comprising:

a plurality of members each having a body with opposed ends, a connector portion at each opposed end and a plurality of grippers, each said gripper has a projection extending from an inner surface of said body, each projection has a tapered face leading into said gripper, said connector portions having a tongue extending from one end of each said body and a groove in the other end of each said body, said tongue of each one of said members being received within said groove of an adjacent member and removably secured thereto, said members being constructed and arranged in an end-to-end assembly so that said connector portion at one end of one of each of said members is removably connected to said connector portion of an adjacent member to form a framework with an open center encircling the casing tube of the cylinder, and so that adjacent grippers of adjacent members releasably engage and grip an associated tie rod disposed between them for releasably clamping the framework to the tie rods of the cylinder assembly.

16. A trunnion mount for a fluid-actuated cylinder assembly having a casing tube and a plurality of tie rods, said trunnion mount comprising:

a plurality of members each having a body .with opposed ends, a connector portion at each opposed end and a plurality of grippers, said connector portions having a tongue extending from one end of each said body and a groove in the other end of each said body, said tongue of each one of said members being received within said groove of an adjacent member and removably secured thereto, said members being constructed and arranged in an end-to-end assembly so that said connector portion at one end of one of said members is removably connected to said connector portion at the other end of an adjacent member to form a framework with an open center encircling the casing tube of the cylinder, and so that adjacent grippers of adjacent members releasably engage and grip an associated tie rod disposed between them for releasably clamping the framework to the tie rods of the cylinder assembly, and each said member has a transverse opening with a counterbore at one end extending through said tongue and an axial threaded opening extending from the groove, and a threaded fastener received in the transverse opening in one member and the axial threaded opening in an adjacent member when said tongue of the one member is assembled in the groove of the adjacent member.

* * * * *

UNITED STATES PATENT AND TRADEMARK OFFICE

CERTIFICATE OF CORRECTION

PATENT NO. : 5,725,195

DATED : March 10, 1998

INVENTOR(S) : Jonathan P. Cotter

It is certified that error appears in the above-indentified patent and that said Letters Patent is hereby corrected as shown below:

Col 4, Line 20, change "mmeidately" to "immediately".

Col 4, Line 59, after "trunnion" insert "mount".

Col 5, Line 9, change dependency from "claim 2" to "claim 10".

Signed and Sealed this

Eleventh Day of August 1998

Attest:

BRUCE LEHMAN

Attesting Officer

*Commissioner of Patents and Trademarks*